United States Patent
Leach

[11] 3,762,935
[45] Oct. 2, 1973

[54] FOAMED CERAMIC MATERIAL
[76] Inventor: Sam L. Leach, 32653 Seagate Dr., Palos Verdes Peninsula, Calif. 90274
[22] Filed: Sept. 29, 1971
[21] Appl. No.: 184,935

[52] U.S. Cl.................... 106/40 R, 264/43, 264/42, 106/122
[51] Int. Cl............................................. C04b 21/00
[58] Field of Search........................ 106/40 R, 122; 264/43

[56] References Cited
UNITED STATES PATENTS

| | | | |
|---|---|---|---|
| 2,920,971 | 1/1960 | Stookey | 106/52 |
| 3,223,537 | 12/1965 | Wiegert et al. | 106/40 R |
| 3,382,082 | 5/1968 | Eubanks et al. | 106/40 R |
| 3,625,723 | 12/1971 | Sicka | 106/40 R |

*Primary Examiner*—A. B. Curtis
*Assistant Examiner*—Mark Bell
*Attorney*—Herbert L. Cantor

[57] ABSTRACT

A foamed-in-place shaped article having high dimensional stability at extremes of heat and cold, good insulating properties, and high tensile strength, a composition for making the same, and the method thereof are disclosed. The composition contains aluminum oxide, a glass frit, bentonite, and phosphoric acid. Optional ingredients are aluminum hydroxide and a metal powder above hydrogen in the electromotive force series. The composition is charged to a mold and allowed to foam-in-place, and then is cured at a relatively low temperature.

10 Claims, No Drawings

FOAMED CERAMIC MATERIAL

BACKGROUND OF THE INVENTION

This invention relates to a foamed-in-place ceramic structure, a composition for making the same, and a method for making the same.

There is a universal need for a basic and economical structural material which can be used to control very wide parameter thermal extremes. The need is further complicated by additional important requirements which, in fact, define and describe the extraordinary conditions that should be met. For example, the material must provide a high order of insulating efficiency over an extended range of temperatures. The material should be unaffected by water and all organic solvents. The material should provide tensile and compression strengths adequate for many predetermined design applications and should be a nonconductor of electricity. Another important requirement is that the material should have outstanding dimensional stability in the presence of extreme heat and/or cold temperatures and it should be capable of being cast into simple geometric shapes as well as sheets. There are many other important characteristics which are desirable or necessary in such a structural material. There has been no prior art material which combines all these desirable characteristics.

There have been attempts in the prior art to produce such a material, but each of these prior art materials has suffered from one or more disadvantages. For instance, there is described in U.S. Pat. No. 3,382,082, issued May 7, 1968 to Alfred G. Eubanks and Ronald E. Hunkeler, a ceramic refractory composition which can be foamed to form a plotting compound. The composition includes 10% to 55% aluminum hydroxide, 39% to 60% phosphoric acid, 0.1% to 0.5% aluminum powder, 0.7% to 4% bentonite, and enough aluminum phosphate to bring the composition to 100%. The aluminum hydroxide and phosphoric acid together make up 50% to 95% of the composition. The mixture is slurried and poured into a mold containing the component to be potted. The composition is then allowed to foam after which it is cured. While this material provides excellent characteristics for potting electronic components, it leaves much to be desired for use as a structural material. The main drawback associated with such a use for this material is the fact that on curing it collapses to a certain extent. This, of course, makes it undesirable for use as a shaped article. Additionally, the composition for making the material includes certain ingredients which are present merely as fillers and take no part in the foaming reaction. This increases the cost and decreases the efficiency.

Other materials and methods have been proposed, but most of these have been extremely inefficient and, therefore, except for certain specialized uses, commercially unacceptable. Such methods include, for example, immersing an open-celled synthetic or natural foam material in a slurry of a ceramic powder, thereby coating the same, and drying the coated organic foam. The organic material is then burned out leaving an open-celled ceramic foam. This foam may be further treated by any one of several methods. This is an expensive and inefficient method and material.

SUMMARY OF THE INVENTION

It is, accordingly, an object of the present invention to provide a composition, method, and shaped article free of the aforementioned and other such disadvantages.

It is a primary object of the present invention to provide a foamed-in-place shaped article having a high order of insulating efficiency over an extended range of temperatures.

It is another object of the present invention to provide a foamed-in-place shaped article which possesses high tensile and compression strengths and is, therefore, useful as a structural material.

It is still another object of the present invention to provide a foamed-in-place shaped article which is unaffected by water and all organic solvents and is a nonconductor of electricity.

It is yet another object of the present invention to provide a foamed-in-place shaped article which has outstanding dimensional stability in the presence of extreme hot and/or cold temperatures and is unaffected by weathering.

It is a further object of the present to provide a foamed-in-place shaped article which can be provided with a variety of surface finishes and is machineable with hand and power tools.

It is another primary object of the present invention to provide a composition for making a foamed-in-place shaped article consistent with the foregoing objects.

It is a further object of the present invention to provide a composition which can be cast into simple geometric shapes as well as sheets.

It is another object of the present invention to provide a composition for making a foamed-in-place shaped article which can be formed and cured at temperatures below 200° F.

It is still another important object of the present invention to provide a material consistent with the foregoing objects which is capable of recycling for ecological purposes.

It is another object of the present invention to provide a composition for making a foamed-in-place shaped article wherein the final properties of the shaped article can be varied by varying the proportions of the ingredients of the composition.

It is still another primary object of the present invention to provide a method of making a foamed-in-place shaped article which is simple and inexpensive.

It is still another object of the present invention to provide a method for making a foamed-in-place shaped ceramic article which can be formed and cured at temperatures below 200° F.

Consistent with the objects of the invention, and according to the present invention, a composition is provided which includes aluminum oxide, a glass frit, bentonite, and phosphoric acid. Under certain conditions, described more fully hereinbelow, the composition could contain aluminum hydroxide and a powdered metal above hydrogen in the electromotive force series, the powdered metal preferably being aluminum. The dry ingredients are thoroughly mixed and the phosphoric acid is then added to make a slurry. The slurry is charged to the mold in the desired amount to produce a product having the desired characteristics and allowed to foam at ambient temperature. When the foaming is complete, or has reached the desired degree, the resulting foamed-in-place shaped article is cured at a temperature below about 200° F. In the preferred embodiment, after curing the object is heated to between 1,000° and 2,000° F for a period of time sufficient for the heat to penetrate throughout the cellular mass. This causes the glass frit to "flux" or melt and flow thereby forming a thin film over the entire surface area of the cellular mass, that is, inside the cells as well as outside, to provide a glass coating. The material is then air quenched.

In its broad aspects, the composition comprises from 0% to about 50% aluminum hydroxide, from 0% to about 50% aluminum oxide, from about 1.0% to about 20% glass frit, from about 0.5% to about 5.0% bentonite, from 0% to about 0.25% of a metal powder above hydrogen in the electromotive force series, and from about 35% to about 60% phosphoric acid, the metal powder being at least about 0.05% when the aluminum oxide is 0% and the aluminum hydroxide and aluminum oxide together comprising from about 30% to about 55% of the composition, all the percentages being by weight of the total composition.

The uses to which the material of the present invention can be put include ceiling panels, structural wall panels, shingles, pipe covers, air duct covers, electrical components, fireproof vaults, heat shields, containers for keeping foods and other products either hot or cold, handles for cooking utensils and the like, flower pots, shipping containers, and the like. The fact that the material can be used at temperatures of greater than 2,000° F on a continuous basis makes it particularly useful. Additionally, by mixing aggregates into the composition before foaming and curing, a cement having extremely desirable properties can be made. Also, the ceramic foam can be made in small particles according to the present invention and, itself, used as an aggregate in a non-foamed cement using the same basic composition.

DETAILED DESCRIPTION OF THE INVENTION

The foam material can be produced as a very dense, hard, monolithic solid, as a cellular material with open cells, or as a cellular material with closed cells. The hardness of the material is above 5.0, and usually is within the range of 7.0 to 9.0 on the Mohs scale. The normal color is a grey-white, although the entire mass may be tinted or colored throughout by using well-known inorganic coloring materials in the basic composition. The surface finish of the finished product reflects the surface of the mold. Various surface finishes can, therefore, be imparted to the finished product by constructing the mold to produce the same.

Additionally, various extenders and aggregates which are well-known in the art can be added to the basic composition to use the same as a cement or the like. These aggregates include, for example, slag, fly ash, or sand which is normally used as an aggregate in the manufacture of concrete. The aggregate could be included in an amount up to 50% of the total mix.

As aforementioned, the composition comprises aluminum oxide, a glass frit, bentonite, and phosphoric acid. The inclusion of aluminum hydroxide and a metal powder above hydrogen in the electromotive force series is optional. In the event such a metal powder is used, under conditions to be described more fully hereinbelow, the preferred metal powder is aluminum. In the composition there is present from 0% to about 50% aluminum hydroxide from 0% to about 50% aluminum oxide, from about 1.0% to about 20% glass frit, from about 0.5% to about 5.0% bentonite, from 0% to 0.25% of a metal powder above hydrogen in the electromotive force series, and from about 35% to about 60% phosphoric acid, the metal powder being present in at least about 0.05% when the aluminum oxide is 0%, and the aluminum hydroxide and aluminum oxide together comprise from about 30% to about 55% of the composition, the percentages being by weight of the total composition. In the preferred embodiment, the composition comprises from about 35% to about 42% aluminum oxide, from about 11% to about 18% glass frit, from about 1% to about 4% bentonite, from about 0.07% to about 0.1% aluminum powder, and from about 40% to about 50% phosphoric acid.

The glass frit is designed to provide a glassy phase to the ceramic composition during the basic chemical reaction. If the ceramic material is produced as a solid mass, then the glass frit serves no useful function during the initial or basic reaction but is carried along as unreacted frit occupying about 10 volume percent. After the initial chemical reaction, the solid mass can be tempered, or heat treated, and quenched to improve the physical properties of the foamed material. By using temperatures of 1,000° to 2,000° F, and preferably 1,600° to 2,000° F, the glass frit melts and flows out of space position to form a thin coating of glass over the entire surface area, both inside and outside, of the foamed material. It should be understood that the glass does not fill the pores of the foam but coats all the surfaces thereof.

During the initial or basic chemical reaction when the ceramic material is being expanded or foamed, the glass frit provides a "glassy phase" to the main body of the material, which is extremely important to the foaming or expansion operation.

Since the foaming or expansion is accomplished with a gas or gasses generated within the material body, this gas must be allowed to expand the material to several times its original volume, but at that time the gas must be contained or constrained in the form of "uni-cells" filled with the expanded gas. The normal ceramic formulation is too porous and open to effectively contain the gas during the "cold-set" period. This failure to contain the gas by ordinary ceramics during foaming operation, results in the foamed or expanded body "dropping or settling" as the gas permeates the porous material to escape.

By utilizing a carefully engineered glass frit designed to provide a "glassy phase" as a result of the exothermic reaction of the formulation base, the cells individually grow larger and remain unconnected. This means that the solids to volume ratio decreases, which results in improved insulating properties for the material subsequently when in use.

After the ceramic material which includes the glass frit has been cast and normal "cold-set" time allowed, followed by essential curing of the mass at a temperature below 200° F, and preferably between about 175° F and about 200° F, for a period of time sufficient to remove moisture and accelerate the basic reaction, then, it is possible to further increase the strength of the cellular mass, by means of "heat-treating and air quenching" the material.

By elevating the temperature to nominally 1,000° to 2,000° F, and preferably 1,600° to 2,000° F, and maintaining this temperature for a period of time sufficient to allow the heat to penetrate throughout the (now insulating) cellular mass, the glass frit is caused to melt and flow. The glass flows as a very thin film over the entire surface area of the cellular mass, inside the cells and outside, to provide a glass coating. The relationship between temperature and thickness is well-known in the art and involves the formula for rate of heat flow H, where $$H = KA\ (t_2 - t_1)/L$$

where
$K$ = thermal conductivity in Btu $\times$ in./hr. $\times$ ft.$^2$ $\times$ °F.;
$A$ = cross-sectional area in ft.$^2$;
$t_2 - t_1$ = temperature difference between the hotter side and the colder side in °F.; and
$L$ = thickness in inches.

It is obvious that this coating of glass effectively provides additional protection against moisture intrusion, vapor or solvent permeability, and inportant barrier protection against certain acids and alkalis.

The glass frit after conversion and quenching in air has a higher coefficient of thermal expansion (and contraction) than the base material in the cellular mass, or solid. During the "heat-treating and quenching" operation, therefore, the glass contracts quickly and to a higher order than the cellular mass which places every part of the cellular-core-mass under "compression" from the compressive forces of the shrinking glass coating. This "pre-loading" by compression in fact actually makes the cellular structure much stronger in tensile strength.

While prior art foamed-in-place ceramic refractory materials are known to have excellent thermal properties, they are difficult to control and often do not maintain their expanded character, but instead "fall" into a compact mass which has very little effective insulating value. The most effective of the prior art materials is that forming the subject matter of the aforementioned U.S. Pat. No. 3,382,082. This material does not yield a reliable and repeatable product when the preferred formulations are practiced precisely.

An analysis of the formulation developed by Eubanks and Hunkeler evidences that the formula is balanced by adding sufficient aluminum phosphate (8 – 10 % by weight) to bring the percent by weight of the composition up to 100%. This amount of material in fact is unreacted in the chemical reaction of the product and although it does not negate an overall reaction, neither does it contribute anything to the formulation except mass.

The product reaction of the formulation detailed by Eubanks and Hunkeler is also aluminum phosphate, and the practice of adding additional aluminum phosphate to the basic formula prevents more effective utilization of this portion of their formula. The basic reaction taught by U.S. Pat. No. 3,382,082 is:

$$H_3PO_4 + Al(OH)_3 + AlPO_4 \quad AlPO_4 + 3H_2O$$

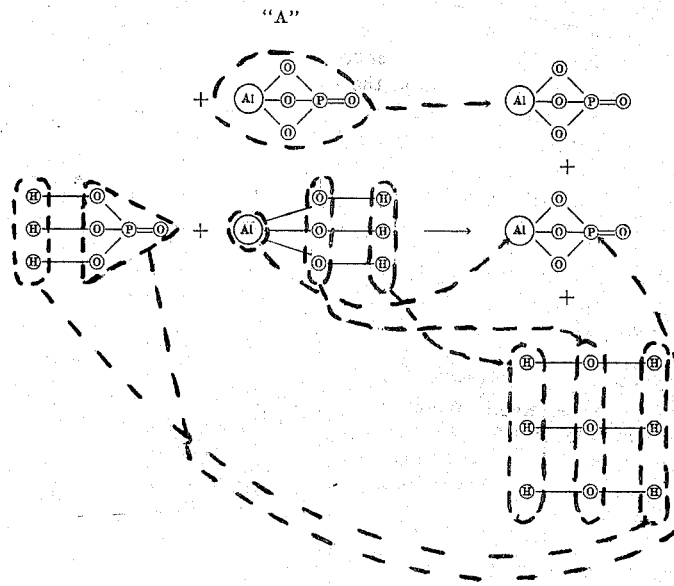

It is obvious from the schematic above that the aluminum phosphate "A" is unreacted therefore redundant to the formula, and by being present in the formula, prevents that portion from making a beneficial contribution to the physical characteristics of the reacted aluminum phosphate.

According to the present invention, a more practical working formulation which provides excellent repeatability and which yields a superior and firm-holding foaming action can be structured around aluminum oxide instead of aluminum hydroxide.

Aluminum oxide, $Al_2O_3$ is an extremely high melting substance with a melting point of about 3,660° F, in which the oxygen-to-aluminum bonding is essentially ionic. Its crystal structure consists of a three-dimensional lattice of Al and O atoms having a 6:4 crystal coordination number. That is, each Al is surrounded octahedrally by six equidistant O neighbors and each O is in turn surrounded tetrahedrally by four equidistant Al neighbors.

An example of a simplified formula in schematic form which evidences an improved product resulting from using aluminum oxide as a base, is as follows:

$$2H_3PO_4 + Al_2O_3 \longrightarrow 2AlPO_4 + 3H_2O$$

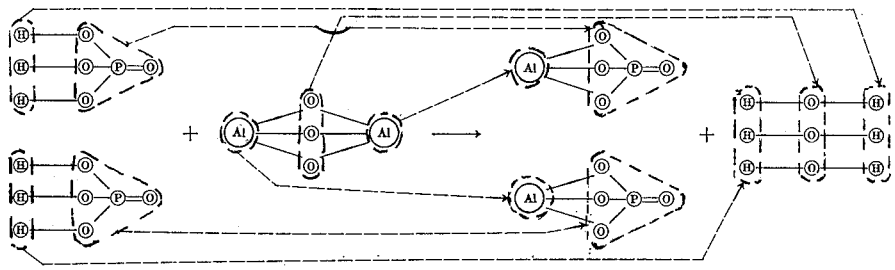

It is obvious that the orthophosphoric acid combines perfectly with the aluminum oxide to form aluminum phosphate and water.

Additional foaming activity can be initiated or generated by the addition in the formula of finely divided particulates, of any metal higher than hydrogen in the electromotive force series, aluminum being preferred. The metal reacts with the phosphoric acid to form hydrogen gas. The hydrogen gas is an important part of the foaming action, and is encouraged to generate slowly and evenly throughout the system to create the uni-cellular structure desired.

When a metal is selected to include in the formulation, care must be exercised to choose a metal which reacts on a predetermined time base to form the hydrogen. The position of the metal in the electromotive force series and the particulate size, control the amount and the timing of the reaction.

In the structuring of the formula it can be taken into consideration that if a metal reacts with an acid to form hydrogen, the equivalent weight of the metal used or required, can be calculated by measuring the quantity of hydrogen evolved from a known weight of the metal. For example, if 3.5 grams of aluminum react with an acid to yield 0.39 gram of hydrogen, the equivalent weight of aluminum required for the formula can be calculated thus:

3.5 g. aluminum/0.39 g. hydrogen = the weight of Al that displaces 1.0g of hydrogen then:

3.5 g al/0.39 × 1.008 = 9.0 g is the equivalent weight of aluminum in this particular example.

The particulate size is extremely important to the reaction speed.

As the particulate is made smaller the surface area exposed increases tremendously for a given weight of metal, therefore, the acid is provided in increasing amount of surface with which to react, (which can be carried to the extreme of near-explosive reactions). Obviously, we are interested only in a system which generates hydrogen slowly and continuously throughout the period of time that the ceramic material can be expanded. The aluminum powder can range from about 80 mesh to between about 5 and 20 microns. The phosphoric acid, of course, can be a commercial grade, which is commonly about 85%.

As the phosphoric acid combines with the aluminum oxide to form aluminum phosphate, heat is generated to the degree that the reaction accelerates itself, and additionally this exothermic heat is quite useful to initiate the curing action and removal of the water formed from the reaction.

As the water is driven from the body the curing action results in a "set" which becomes progressively harder and more dense.

At a point during this curing action, the hydrogen gas cannot expand further against the restraining action of the reaction product at which time the foaming action ceases, and the cellular structure is complete.

It was unexpectedly found that the hydrogen gas is impossible to capture on a precalculated basis using the formula of U.S. Pat. No. 3,382,082.

The addition of a frit which was formulated carefully to yield a "glassy-phase" during the foaming period, entraps the expanding hydrogen gas successfully in a calculable basis, to provide a system compatible with the basic formula, in fact, which is carried along with the basic formula in an unreacted state during the primary reaction.

The design of this glass frit is very important for additional reasons which must be discussed. The very first consideration, of course, is to select glass making components that are compatible with the foam formula. By "compatible" is meant chemical compatibility, particulate size compatiblity and color reaction.

Secondly, the frit will be "fluxed", if desired, out of the porous structure of the cellular foam body, to achieve a coating of glass throughout and over all the exposed as well as unexposed surfaces. The glass frit yields a coating of such physical characteristics as is most desired, such as acid resistance, etc.

Thirdly, the glass frit provides a known amount of "com-pression" when caused to melt-flow-cool over the cellular body, and this compression will greatly enhance the strength of the body. The effect is that of tempering glass, or metal by heat treating and a quenching action.

Glass frits which have been found to be satisfactory generally comprise from about 24% to about 36% $SiO_2$, from about 10% to about 25% $B_2O_3$, from about 15% to about 26% $TiO_2$, from about 15% to about 20% $Na_2O$, from about 3% to about 7% $K_2O$, from about 4% to about 5% of $Li_2O$, from about 1% to about 11% BaO, from 0% to about 3% $Sb_2O_3$, from 0% to about 10% ZnO, and from 0% to about 3% Fe, all the percentages being by weight. More specifically, the frits which provide best results have compositions as set forth in Table 1.

TABLE 1

| Frit | Weight percent | | | | | |
|---|---|---|---|---|---|---|
| | A | B | C | D | E | F |
| $SiO_2$ | 24.8 | 24.8 | 25.8 | 25.0 | 25.0 | 24.8 |
| $B_2O_3$ | 14.9 | 14.9 | 24.8 | 15.0 | 15.0 | 10.9 |
| $TiO_2$ | 23.8 | 23.8 | 15.9 | 18.0 | 18.0 | 25.8 |
| $Na_2O$ | 19.8 | 15.9 | 16.9 | 17.0 | 17.0 | 18.9 |
| $K_2O$ | 6.9 | 6.9 | 3.0 | 7.0 | 7.0 | 6.9 |
| $Li_2O$ | 4.0 | 4.0 | 5.0 | 4.0 | 4.0 | 4.0 |
| BaO | 1.0 | 4.9 | 6.8 | 11.0 | 1.0 | |
| $Sb_2O_3$ | 3.0 | 3.0 | | 3.0 | 3.0 | 1.0 |
| ZnO | | | | | 10.0 | 5.0 |
| Fe [1] | 1.8 | 1.8 | 1.8 | | | 2.7 |

[1] As $Fe_2O_3$ but calculated as Fe.

Before proceeding further, it should be noted that an important difference in this new ceramic structure and the existing state of the art expanded ceramic materials, is resident in the fact that the aluminum oxide utilized, has itself been carefully created from purified aluminum hydrate in such manner as to provide an aluminum oxide of precise molecular structure, internuclear dimensions, and bond energies, for optimum reaction in the basic formula.

Aluminum oxide exists in several different crystallographic forms. The one which occurs in nature as corundum is designated as the alpha form, and is characterized by a high specific gravity (4.0), a high melting point (nominally 2,015° C, or 3,660° F) and great insolubility. Its very high hardness makes it one of the most useful of natural or artificial abrasives. Commercially pure aluminum oxide is made by calcining the purified hydrate at temperatures around 2,000° F. Its principal impurities are soda (0.1%–0.6%) iron oxide and silica (usually less than 0.03% each).

When the aluminum hydrates are heated to gradually increasing temperatures up to about 1,000° F, they are decomposed and lose most of their water. The aluminum oxide formed goes through a series of physical changes as the temperature increases, and the products of the changes are interesting and commercially important. At the lower temperatures, water is driven out without appreciable shrinkage of the particulates; so that the result is a porous structure (particulate).

The area exposed in the pores when the water has been driven out can be measured by physicochemical means, and may be as high as several hundred square meters per gram. If left in this condition, this surface is extremely active and has the power of absorbing water vapor and certain other gaseous molecules. This product is commercially known as activated alumina which is widely used in drying gases and some liquids. The affinity of this activated alumina surface for water vapor is such that air may be dried completely by it.

As the aluminum hydrate is heated to higher temperatures it begins a slow "shrinking" process, which reduces the porosity of the particulate structure in direct relation to the amount of heat involved. This calcining of the hydrate to obtain the commercially pure aluminum oxide then, can be the method to achieve a predetermined amount of porosity of the basic aluminum oxide that when combined with the "glassy-phase" formulation, you will have the capability of pre-engineering a balance between maximum porosity of the particulate consistent with restraining the foaming (or expansion) gas at the critical point by utilizing the "glassy-phase" restraint of the glass frit. Obviously, a particulate can be so porous as to be beyond the sealing potential of the glass-phase additive, which, under those conditions yields a micro-porous sub-cellular, and cellular structure which cannot be sealed and constrained by the glass frit produced glassy phase. This yields a foamed ceramic material which expands rapidly and severely in the beginning to then fall almost to its original volume, with no desirable insulating properties of interest.

It follows that when the aluminum hydrate is heated to the precise temperature that provides a calcined aluminum oxide with known porosity which is compatible with the sealing properties of the glassy-phase formulation, then a final product with a maximum "volume to weight relationship" with absolutely no loss in other desirable properties is achieved. This temperature is about 1,800° to 1,900° F.

Alpha trihydrate (gibbsite or hydroagillite), is the hydrate sold commercially as hydrated alumina.

This is the raw material out of which commercial alumina is prepared by calcination. After filtering and cleaning the precipitated hydrate is washed and dried, or else calcined if oxide is the desired product, and the very precise control of temperatures and time provide adequate control over the porosity of the calcined oxide to yield an oxide which lends itself to the "glassy-phase" control. The alumina used in the present invention is commercially available. The particle size should be from about 15 to about 50 microns.

Aluminum hydroxide can be used, however the formula is somewhat more difficult to balance without resotring to the use of aluminum phosphate to complete the balance, and this is undesirable to include as an unreacting, space occupying ingredient. Instead, by utilizing aluminum oxide, which allows more flexibility of direction, then we can structure the formula.

According to the method of the present invention the dry ingredients are thoroughly mixed and then the phosphoric acid is added. The phosphoric acid can be of any concentration but, since considerable water is illustrated, a more concentrated phosphoric acid is preferred. Thus, 100% phosphoric acid could be used or, as is more commercially available, 85% phosphoric acid. The resulting slurry is thoroughly mixed and charged to a mold of the desired size and shape. The mold is preferably suitably lubricated such as with a silicone oil. The amount of the slurry added to the mold is determined by the physical characteristics desired in the final product. This can be readily calculated by methods which are well-known in the art. After charging the slurry to the mold, the material is allowed to foam in place at ambient temperature for a sufficient period of time to produce the desired product. This time is usually in the neighborhood of up to about 30 minutes. The material is then cured at under 200° F, and preferably at between 175° and 200° F. In the preferred embodiment, the now solidified ceramic foam shaped article is removed from the mold and heated to between 1,000° and 2,000° F, and preferably between 1,600° and 2,000° F, for a sufficient period of time to "flux" the glass. The shaped object is then air tempered and removed from the mold.

The present invention is further illustrated by the following examples, although it is to be understood that it is not intended to be limited thereto.

EXAMPLE 1

A slurry was made of the following ingredients:

|  | Grams | Percent |
|---|---|---|
| $Al_2O_3$ | 150.0 | 41.06 |
| Glass Frit (Type A) | 40.0 | 10.95 |
| Bentonite ($Al_2O_3 \cdot 5SiO_2 \cdot 7H_2O$) | 5.0 | 1.37 |
| Al powder | 0.3 | 0.008 |
| $H_3PO_4$ | 70.0 | 46.54 |
| Total | 365.3 | 100.00 |

After thoroughly mixing the ingredients the resulting slurry was charged to a mold and allowed to foam in place for 30 minutes at room temperature. The mold was then placed in an oven at about 200° F for 2 hours. After cooling the shaped article was removed from the mold and exhibited desirable mechanical and thermal properties.

EXAMPLE 2

A shaped article was made according to the procedure of Example 1, but after curing at about 200° F for 30 minutes, it was heated to approximately 1,000° F and maintained at that temperature for 7 minutes.

The product was then air quenched and cooled. The product had a nominal specific gravity of 2,567 and a nominal molecular weight of 121.95. It was unaffected by 2,500° F for 2 hours. The product was also unaffected by water and organic solvents. It exhibited a hardness of between 7.0 and 9.0 on the Mohs scale. The K-factor was 0.25.

EXAMPLES 3 – 7

The procedure of example 2 was followed in each of examples 3 – 7 but the glass frits B – F, respectively, were used in place of glass frit A. The final products exhibited the same characteristics.

EXAMPLES 8 – 19

Compositions were made as shown in Table 2, poured into a mold, foamed, cured, and heat treated as in example 2.

What is claimed is:

1. A foamed-in-place shaped article having high dimensional stability at extremes of heat and cold, good insulating properties, and high tensile strength, comprising a ceramic foam structure having a multiplicity of non-communicating cells, the surfaces of the walls defining each cell having a coating of non-porous glass on the entire surface thereof, said glass thereby imparting increased mechanical strength and barrier protection to said structure.

2. A shaped article as defined in claim 1, wherein said glass comprises from about 24% to about 36% $SiO_2$, from about 10% to about 25% $B_2O_3$, from about 15% to about 26% $TiO_2$, from about 15% to about 20% $Na_2O$, from about 3% to about 7% $K_2O$, from about 4% to about 5% $Li_2O$, from about 1% to about 11% $BaO$, from 0% to about 3% $Sb_2O_3$, from 0% to about 10% $ZnO$, and from 0% to about 3% $Fe$, said percentages being by weight.

3. A shaped article as defined in claim 2, wherein said ceramic foam structure comprises aluminum phosphate.

4. A composition for making a foamed-in-place shaped article having high dimensional stability at extremes of heat and cold good insulating properties, and high tensile strength, comprising a ceramic foam structure having a multiplicity of cells, said composition comprising from 0% to about 50% aluminum hydroxide, from 0% to about 50% aluminum oxide, from about 1.0% to about 20% glass frit, from about 0.5% to about 5.0% bentonite, from 0% to about 0.25% of a metal powder above hydrogen in the electromotive force series, and from about 35% to about 60% phosphoric acid, said metal powder being at least about 0.05% when said aluminum oxide is 0%, said aluminum hydroxide and aluminum oxide together comprising from about 30% to about 55% of said composition, said percentages being by weight of the total composition.

TABLE 2

| | Example | | | | | | | |
|---|---|---|---|---|---|---|---|---|
| | 8 | | 9 | | 10 | | 11 | |
| | Grams | Percent | Grams | Percent | Grams | Percent | Grams | Percent |
| Al(OH)$_3$ | 34.00 | 34.00 | 30.00 | 22.87 | | | | |
| Al$_2$O$_3$ | 7.00 | 7.00 | 30.00 | 22.87 | 50.00 | 39.97 | 40.00 | 35.06 |
| Glass frit | 8.00 | 8.00 | 10.00 | 7.60 | 15.00 | 11.99 | 29.00 | 17.53 |
| Bentonite | 1.00 | 1.00 | 1.00 | 0.76 | 5.00 | 4.00 | 2.00 | 1.75 |
| Al powder | 0.10 | 0.10 | 0.15 | 0.11 | 0.10 | 0.08 | 0.10 | 0.09 |
| H$_3$PO$_4$ | 50.00 | 50.00 | 60.00 | 45.75 | 55.00 | 43.96 | 52.00 | 45.57 |
| Total | 100.10 | 100.10 | 131.15 | 99.96 | 125.10 | 100 | 114.1 | 100 |

| | 12 | | 13 | | 14 | | 15 | |
|---|---|---|---|---|---|---|---|---|
| | Grams | Percent | Grams | Percent | Grams | Percent | Grams | Percent |
| Al(OH)$_3$ | 34.00 | 34.98 | 31.00 | 43.27 | 50.00 | 42.19 | 30.00 | 25.42 |
| Al$_2$O$_3$ | 4.00 | 4.12 | | | 11.00 | 9.28 | 30.00 | 25.42 |
| Glass frit | 5.00 | 5.14 | 9.00 | 12.56 | 6.00 | 5.06 | 6.00 | 5.08 |
| Bentonite | 4.00 | 4.12 | 1.50 | 2.09 | 1.50 | 1.27 | 2.00 | 1.69 |
| Al powder | 0.20 | 0.21 | 0.15 | 0.21 | | | | |
| H$_3$PO$_4$ | 50.00 | 51.44 | 30.00 | 41.87 | 50.00 | 42.19 | 50.00 | 42.37 |
| Total | 97.2 | 100.01 | 71.65 | 100 | 118.50 | 99.99 | 118.00 | 99.98 |

| | 16 | | 17 | | 18 | | 19 | |
|---|---|---|---|---|---|---|---|---|
| | Grams | Percent | Grams | Percent | Grams | Percent | Grams | Percent |
| Al(OH)$_3$ | 30.00 | 25.42 | 15.00 | 11.72 | 15.00 | 10.14 | 103.00 | 34.77 |
| Al$_2$O$_3$ | 30.00 | 25.42 | 45.00 | 35.16 | 45.00 | 30.41 | 15.00 | 5.06 |
| Glass frit | 6.00 | 5.08 | 6.00 | 4.69 | 6.00 | 4.05 | 24.00 | 8.10 |
| Bentonite | 2.00 | 1.69 | 2.00 | 1.56 | 2.00 | 1.35 | 9.00 | 3.04 |
| Al powder | 0.10 | 0.08 | | | | | 0.20 | 0.07 |
| H$_3$PO$_4$ | 50.00 | 42.37 | 60.00 | 46.88 | 80.00 | 54.05 | 145.00 | 48.95 |
| Total | 118.10 | 100.06 | 128 | 100.01 | 148 | 100 | 296.2 | 99.99 |

It should be apparent from the foregoing detailed description that the objects set forth hereinabove have been successfully achieved. Moreover, while there is shown and described a present preferred embodiment of the invention, it is to be distinctly understood that the invention is not limited thereto, but may be otherwise variously embodied and practiced within the scope of the following claims. Accordingly, 5. A composition as defined in claim 4, wherein said metal is aluminum and said phosphoric acid is orthophosphoric acid.

6. A composition as defined in claim 5, comprising from about 35 to about 42% aluminum oxide, from about 11% to about 18% glass frit, from about 1% to about 4% bentonite, from about 0.07% to about 0.1% aluminum powder, and from about 40% to about 50% orthophosphoric acid.

7. A composition as defined in claim 5, wherein said glass frit comprises from about 24% to about 36% $SiO_2$, from about 10% to about 25% $B_2O_3$, from about 15% to about 26% $TiO_2$, from about 15% to about 20% $Na_2O$, from about 3% to about 7% $K_2O$, from about 4% to about 5% $Li_2O$, from about 1% to about 11% BaO, from 0% to about 3% $Sb_2O_3$, from 0% to about 10% ZnO, and from 0% to about 3% Fe, said percentages being by weight.

8. A composition as defined in claim 7, comprising about 150 parts by weight aluminum oxide, about 40 parts by weight glass frit, about 5 parts by weight bentonite, about 0.3 parts by weight aluminum powder, and about 170 parts by weight orthophosphoric acid.

9. A composition as defined in claim 8, wherein said glass frit comprises about 24.8% $SiO_2$, about 14.9% $B_2O_3$, about 23.8% $TiO_2$, about 19.8% $Na_2O$, about 6.9% $K_2O$, about 4.0% $Li_2O$, about 1.0% BaO, about 3.0% $Sb_2O_3$, and about 1.8% Fe as $Fe_2O_3$.

10. A composition as defined in claim 4, further comprising an aggregate in an amount of up to 50% by weight of the total composition.

* * * * *